Oct. 29, 1963

W. B. ELAM 3,108,516

SPIRAL WINDING MACHINE

Filed Dec. 28, 1960

INVENTOR.
WILLIAM BINFORD ELAM
BY

AGENT

United States Patent Office 3,108,516
Patented Oct. 29, 1963

3,108,516
SPIRAL WINDING MACHINE
William Binford Elam, Jersey City, N.J., assignor to American Can Company, New York, N.Y., a corporation of New Jersey
Filed Dec. 28, 1960, Ser. No. 79,012
7 Claims. (Cl. 93—80)

The present invention relates to machines for making spirally wound containers and has particular reference to a winding mandrel for such machines which is formed with an easily renewable, low-friction exterior surface.

Many types of fibre container bodies are presently being made on machines which are known in the trade as spiral winders. In such machines, the severel webs of material which comprise the various body plies in the finished bodies are pulled onto and wrapped around a stationary winding mandrel by an endless belt which presses the webs tightly against the winding mandrel while forcing them helically along the mandrel to form them into an endless tube which is subsequently cut into lengths to form individual container bodies. Since the winding belt must exert a substantial pressure to create a firm tube, considerable friction exists between the innermost web and the winding surface of the mandrel.

In some cases, as where the innermost web is formed of or lined with a relatively fragile material such as foil, this friction is sufficient to discolor and/or tear the web unless steps are taken to reduce it, as by using a lubricant between the mandrel and the web or by interposing a web of thin paper therebetween to act as a slip or buffer layer which is later discarded. Since these methods require the use of additional materials, they add to the cost of the containers.

The present invention contemplates a mandrel construction which makes it possible to reduce the friction between the tube and the mandrel without adding to the material cost of the container. This result is effected by forming the mandrel with an external layer of material which has a slipperier surface than has the material from which the core portion of the mandrel is made. This external layer preferably comprises a tap which is wrapped around the mandrel at the same helix angle as the helix angle at which the body webs are fed onto the mandrel, and is anchored at its front end to keep it from being moved along the mandrel with the wound tube.

If desired, the tape which is wound around the mandrel may constitute the free end of a long length of tape which extends from a reel or other source of supply so that when the portion of tape being used is worn out, it may be cut off and a new length of tape pulled from the reel and wrapped around the mandrel to renew its winding surface. Alternatively, the whole length of tape may be removed and replaced when it is no longer usable because of excessive wear.

The tape may be made of any suitable material having the desired characteristics. Tapes made from materials such as nylon or other suitable plastics, polished stainless steel, or chrome plated steel may under some conditions be quite satisfactory.

However, the preferred material compries a fibreglass fabric tape which is impregnated with Teflon, which is a polymerized tetrafluoro ethylene.

Such a tape is quite strong, and has a surface which reduces the coefficient of friction between the tape and the tube to a minimum. Obviously, however, other slippery impregnants such as silicone resins may be used, as well as other types of tape fabrics.

In addition to the advantage of making it possible to reduce the coefficient of friction between the mandrel and the tube, the use of tape as a facing material for the mandrel makes it possible to easily vary the diameter of the mandrel by merely changing from a tape of one thickness to a tape of a different thickness. In effect, the tape becomes an inexpensive change part for the machine and permits the manufacture of tubes of different diameters without requiring a separate mandrel for each diameter.

An object of the invention therefore is the provision of an inexpensive winding mandrel of simple construction which is provided with an easily renewable exterior surface.

Another object is the provision of a winding mandrel having a slippery surface which reduces the friction between the mandrel and the tube being formed on it and thus minimizes spoilage.

Still another object is to provide a spiral winding mandrel which is provided with an exterior layer which is easily replaceable to permit a change in the diameter of the mandrel and consequently of the tube which is formed on it.

Numerous other objects and advantages of the invention will be apparent as it is better understood from the following description, which, taken in connection with the accompanying drawings, discloses a preferred embodiment thereof.

Referring to the drawings.

Figure 1:
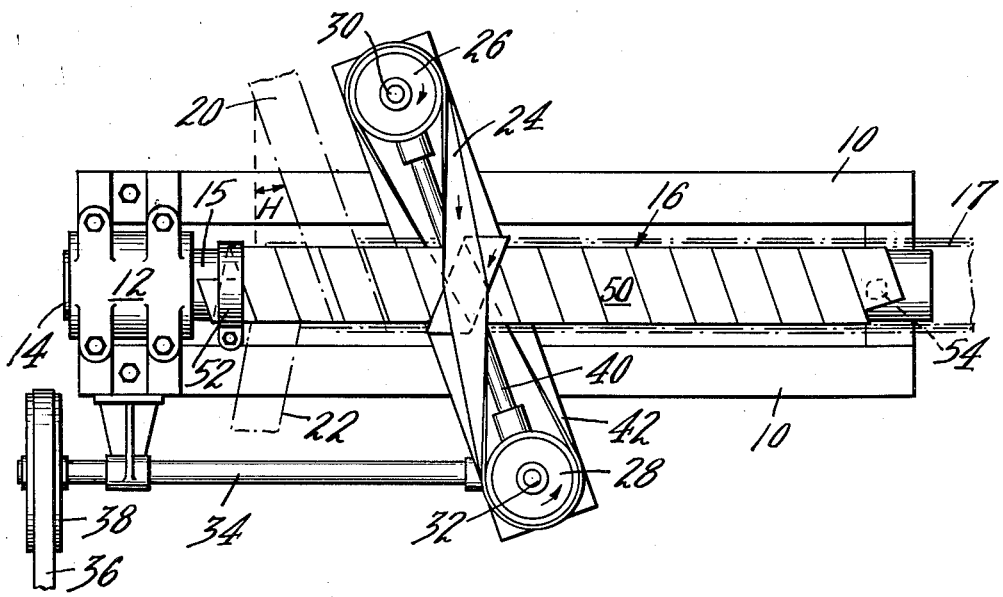
FIGURE 1 is a plan view of the principal parts of a spiral winder embodying the principles of the instant invention, parts being broken away.

As an exemplary and preferred form of the instant invention, the drawings disclose a spiral winder of the type which is generally disclosed in United States Patent 1,689,593 which was issued to Donald G. Magill on October 30, 1928.

The principal parts of such machine include a main frame 10 which carries a clamp bracket 12 in which is fixedly mounted one end 14 of a solid cylindrical bar which comprises the core portion 15 of a winding mandrel 16, the other end of the core 15 being free and unsupported to permit the endless tube 17 (shown in dot and dash lines in FIG. 1) which is formed on the mandrel 16 to leave the machine without interference.

The tube 17 is formed from a pair of fibre webs 20, 22, shown in dot and dash lines, which are obtained from suitable supply rolls (not shown) and are helically wound around the mandrel 16, in overlapping relationship to each other with the helical edges of each web in self-abutting relationship, by an endless winding belt 24 which operates around and is driven by a pair of pulleys 26, 28 which are respectively mounted on a pair of shafts 30, 32. As seen in FIG. 1, one flight of the belt 24 is wound around the mandrel 16 so that it encircles the webs 20, 22 and pulls them from their supply rolls and forms them into the tube 17. The shaft 32 is geared to and rotated by a drive shaft 34 which is driven from a drive motor (not shown) through a belt 36 which operates around a drive pulley 38 keyed to the shaft 34. The rotation of the shaft 32 is transmitted to the shaft 30 through a cross-shaft 40 which is suitably geared to both shafts 30, 32.

The shafts 30, 32 are mounted on a frame 42 which is disposed obliquely to the mandrel 16 at an angle which is equal to the helix angle (designated as H in FIG. 1) at which the webs 20, 22 are wound around the mandrel 16. As a result, the belt 24 engages tightly against the outermost web and rotates the tube 17 and simultaneously advances it along the mandrel 16, thus imparting a helical motion to it. As is well known in the art, one of the mutually contacting surfaces of the webs 20, 22 is coated with an adhesive prior to being wound around the mandrel 16 in order to secure the webs 20, 22 permanently together so that the tube 17 will not come apart as it leaves the machine.

The outer surface of the mandrel 16 comprises a length of tape 50 which is wrapped helically around the mandrel core 15 with its helical edges in abutting relationship, as clearly seen in FIG. 1. The tape 50 preferably extends for almost the full length of the mandrel core 15 and has its front end anchored to the core 15 by a clamp 52 so that the tape is not stripped from the mandrel core 15 by the pressure of the winding belt 24. As seen in FIG. 1 the helix angle of the tape 50 is identical to the helix angle H of the body webs 20, 22 so that as the tube 17 is formed on the mandrel 16 and moved helically along the mandrel 16 by the winding belt 24, its helical motion keeps the tape 50 taut and in proper position on the mandrel core 15. If desired, as in cases where the tape 50 is not completely limp, a dab of an adhesive 54 which remains tacky at room temperature and thus permits limited sliding movement of the tape 50 relative to the mandrel core may be used to hold the tape 50 against unwinding when the tube is not present on the mandrel, as may occur when the machine is idle.

Obviously, the inner diameter of the tube 17 which is being wound on the machine is equal to the diameter of the mandrel core 15 plus twice the thickness of the tape 50. Thus, the diameter of the tube can be readily varied by the replacement of the tape 50 with a tape of a different thickness. Also, in the event continued use wears out the tape 50, it can easily be removed and replaced by another length of similar tape.

The tape 50 may be made of any suitable material having a suitably smooth and long wearing surface. Thus, in some instances, as where the principally desired advantages are the ease of change from one diameter to another or the replacement of worn wearing surfaces, the tape 50 may be made of a smooth metal such as polished or chrome plated steel. However, in order to make full use of the advantages offered by the instant invention, the tape 50 is preferably formed of materials which have a slippery surface which greatly reduces the friction between the tape 50 and the tube which is being wound on it. One material which is suitable for such use is nylon, which is extremely tough as well as slippery. As another example, a suitable tape is one made of woven glass fibres (commonly known as fibreglass) which has been impregnated with Teflon, a polymerized tetrafluoro ethylene. Obviously, however, in its broad aspects the invention is not limited to any particular type of tape.

Figure 2:
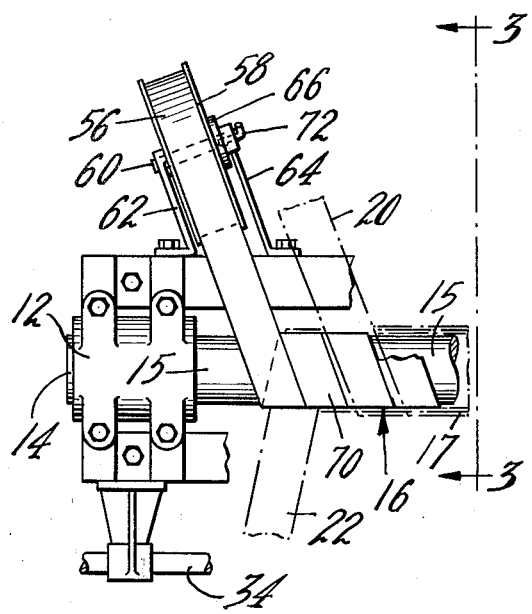
FIG. 2 is a plan view of a portion of a spiral winder embodying a modified form of the invention, parts being broken away.
Figure 3:
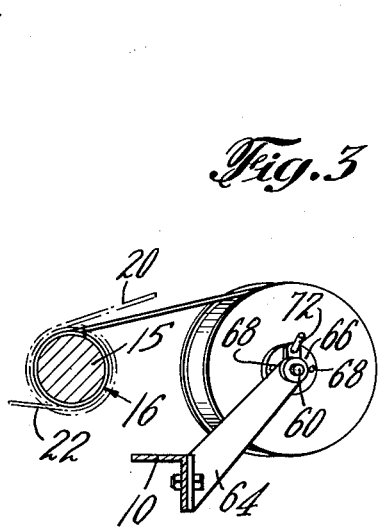
FIG. 3 is a vertical section taken substantially along the line 3—3 in FIG. 2.

FIGS. 2 and 3 disclose a modified form of the invention wherein replacement of worn out tape is facilitated. In this form, the tape, instead of being provided in the form of a length just long enough to cover the mandrel core 15 as in FIG. 1, is supplied in much longer lengths, the excess tape 56 being preferably contained in roll form on a supply reel 58 which is mounted on a shaft 60 which is held in bearing brackets 62, 64 bolted to the main frame 10. One side of the reel 58 is provided with a hub 66 which is formed with a number of stop recesses 68 (see FIG. 3) which permit the reel 58 to be locked against rotation when engaged by a stop pin 72, which is carried in the bearing bracket 64, thus anchoring in place the tape portion 70 which is wound around the mandrel core 15. When the tape portion 70 is no longer usable because of excessive wear, it is easily replaced by severing it from the tape portion 56 and stripping it from the mandrel core 15, after which the stop pin 72 is disengaged from the hub 66, thus permitting a new length of tape to be pulled from the reel 58 and wrapped around the mandrel core 15. Thereafter, the pin 72 is again positioned in a recess 68 to anchor the new length of tape against movement relative to the mandrel core 15. This replacement operation may be repeated until the supply of tape on the reel 58 is exhausted.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A spiral winding machine comprising a winding mandrel and means for wrapping at least one ply of web material helically around said mandrel at a predetermined helix angle to form it into a tube and for advancing said tube axially along said mandrel, said mandrel being formed with a core and a replaceable exterior layer which comprises a tape wrapped helically around said mandrel substantially throughout its operative length and anchored against axial movement relative thereto, said tape having an outer surface providing less frictional resistance to the movement of said tube therealong than that of the outer surface of said mandrel core.

2. The machine of claim 1 wherein the helix angle of said anchored helically wrapped tape is identical to the helix angle at which said advancing ply of web material is wound onto said mandrel.

3. The machine of claim 2 wherein the helical edges of said anchored helically wrapped tape are abutted.

4. The machine of claim 3 wherein the tape which is wrapped around and anchored to the mandrel core comprises an end portion of a longer length of tape, the balance of which comprises a replacement supply of tape.

5. The machine of claim 4 wherein said replacement supply of tape is wound on a reel mounted for rotation in a direction substantially at said helix angle.

6. The machine of claim 1 wherein said tape is formed of glass fibres impregnated with polymerized tetrafluoro ethylene in order to reduce the friction between said mandrel and the tube which is being wound on and advanced along said mandrel.

7. The machine of claim 1 wherein said tape is made of nylon.

References Cited in the file of this patent

UNITED STATES PATENTS

| | | |
|---|---|---|
| 242,836 | Norriss | June 14, 1881 |
| 945,862 | Osborn | Jan. 11, 1910 |
| 1,428,382 | Marquette | Sept. 5, 1922 |
| 2,046,138 | Tucker | June 30, 1936 |
| 2,336,540 | Graves | Dec. 14, 1943 |
| 2,760,896 | Nash | Aug. 28, 1956 |
| 2,877,150 | Wilson | Mar. 10, 1959 |
| 2,977,671 | Wiegand | Apr. 4, 1961 |
| 2,982,334 | Cooper et al. | May 2, 1961 |